United States Patent Office 3,189,593
Patented June 15, 1965

3,189,593
POLYAZO DYES
Heinz Wicki, Allschwil, Basel-Land, Switzerland, assignor to Sandoz Ltd., Basel, Switzerland
No Drawing. Filed Feb. 25, 1963, Ser. No. 260,888
Claims priority, application Switzerland, Feb. 28, 1962, 2,455/62; July 25, 1962, 8,929/62
6 Claims. (Cl. 260—144)

This invention relates to polyazo dyes of the formula

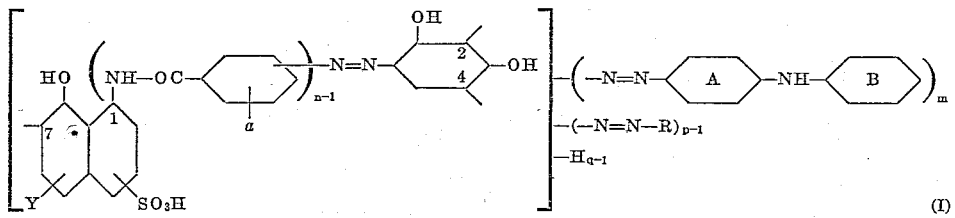

(I)

wherein $n$ represents the integer 1 or 2, $m$, $p$ and $q$ each represent the integer 1, 2 or 3, the sum $m+p+q$ being 5, $a$ represents a hydrogen atom, a halogen atom (chlorine, bromine), a substituted or unsubstituted alkyl or alkoxy group (e.g. methyl, ethyl, methoxy, ethoxy), Y represents a hydrogen atom or the sulfonic acid group, and R the radical of any desired diazo component, and in which the nuclei A and/or B may contain any substituents with the exception of sulfonic acid groups.

These new dyes (I) can conveniently be prepared by coupling $m$ moles of a diazotized amine of the formula

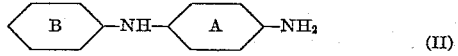

(II)

and $p-1$ moles of any other diazo component with 1 mole of a coupling component of the formula

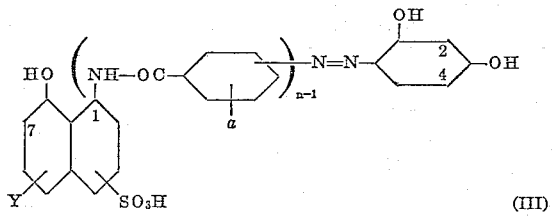

(III)

The preferred dyes are those that are obtained when the nuclei A and/or B of the amine of Formula II contain at least one carboxyl group.

The radicals of the freely chosen diazo components may be, for example, the diazo compounds of substituted or unsubstituted aminobenzenes, aminonaphthalenes, aminohydroxynaphthalenes, aminonaphthalene sulfonic acids, aminohydroxynaphthalene sulfonic acids, and aminonaphthalenes which may be further substituted, e.g. with chlorine or bromine, arylamino, alkylamino, and substituted aminonaphthalenes. Diazo components which already contain one azo group can also be employed.

The following are named as examples of substituents of the aminobenzenes: halogen (chlorine, bromine), nitro, sulfonic acid, carboxyl, alkyl such as methyl, ethyl etc., alkoxy such as methoxy, ethoxy, substituted or unsubstituted alkyl or alkoxy, sulfonamide, alkylsulfonamide, etc.

When derivatives of aminodiphenylcarboxylic acids are used as compounds of Formula II, the coupling of the resulting diazo compound with a compound of Formula III can be effected in an acid or alkaline medium. When coupling is carried out in an acid medium, e.g. an acetic acid medium, at pH values between 2 and 6 or preferably pH 4–5 and at temperatures between $-10°$ and $+30°$ C. or preferably 0–15° C., the diazo compound is preferentially introduced into the 2-position of the 1,3-dihydroxybenzene nucleus. It has been found that under the aforestated conditions scarcely more than 1 mole of such a derivative of Formula II is capable of coupling with 1 mole of a compound of Formula III. Hence it is possible to couple in alkaline medium 1 mole of the resulting disazo dye with 1 or 2 moles of a compound of Formula II having at least one carboxyl group, or with 1 or 2 moles of a compound of the formula —N=N—R.

In contrast to the above reaction, the coupling in alkaline medium of a derivative of an aminodiphenylcarboxylic acid of Formula II with a compound of Formula III causes the diazo compound to enter into the 2- or 4-position of the 1,3-dihydroxybenzene nucleus or into the 7-position of the naphthalene nucleus. In most cases the final product is heterogeneous. Under alkaline conditions 1, 2 or 3 moles of a derivative of an aminodiphenylcarboxylic acid or 1 or 2 moles of a compound of the formula —N=N—R can be coupled with 1 mole of a compound of Formula III in any desired order.

These reactions are carried out in the pH region of 7.5 to 12 or preferably between pH 8.5 and 9.5 and at temperatures of $-10°$ to $+30°$ C. or preferably between 0° C. and $+10°$ C. in an aqueous medium, to which an organic solvent, e.g. pyridine or a mixture of pyridine bases, may be added as required.

When aminodiphenylamine derivatives having no carboxyl group are used as compounds of Formula II in the present process, the coupling of the resulting diazo compound with a compound of Formula III is conducted preferably in an acid aqueous, e.g. acetic acid, medium, at pH values of 2 to 6 or more particularly 4 to 5 and at temperatures of $-10°$ C. to $+30°$ C. or preferably 0–15° C., if necessary in the presence of an organic solvent, e.g. pyridins or a mixture of pyridine bases. Under the aforestated conditions such compounds enter preferentially into the 2-position of the 1,3-dihydroxybenzene nucleus. It has been found that under the above conditions scarcely more than 1 mole of such a compound of Formula II can be coupled with 1 mole of a compound of Formula III; it is therefore possible to couple 1 mole of the disazo dye so formed with 1 or 2 moles of a compound of Formula II having at least one carboxyl group or with 1 or 2 moles of a compound of the formula —N=N—R. These reactions are performed in aqueous medium in the pH region of 7.5 to 12 or preferably at pH 8.5 to 9.5 and in the temperature range of $-10°$ to $+30°$ C. or preferably 0° to +10° C., if necessary with the addition of an organic solvent, e.g. pyridine or a mixture of pyridine bases. These compounds are preferentially introduced into the 4-position of the 1,3-dihydroxybenzene nucleus or into the 7-position of the naphthalene nucleus. The products are for the most part heterogeneous in constitution.

The new dyes are readily soluble in water, stable to acids and alkalis, and possess high affinity for leathers manufactured with different tannages, notably combination tanned leather. They give bright red to yellowish dark-brown shades.

When in the present process nitro derivatives of aminodiphenylaminocarboxylic acids are used as compounds of Formula II, valuable dyes are obtained which give yellowish dark-brown shades on leather having excellent fastness properties. These dyes are therefore of special interest for the dyeing and printing of leather.

The dyes obtained according to the invention are notable for good level-dyeing properties and consistency of shade on leathers of different tannage, good building-up properties in neutral to weakly acid dyebaths, very good stability to acids and alkalis, good fastness to buffing on chrome suede leather, very good fastness to migration in polyvinyl chloride and crêpe rubber, very good fastness to formaldehyde, very good pressing fastness, and good light fastness.

In the following examples the parts and percentages are by weight and the temperatures in degrees centigrade.

EXAMPLE 1

319 parts (1 mole) of 1-amino-8-hydroxynaphthalene-3,6-disulfonic acid are diazotized in the usual way and coupled with 110 parts (1 mole) of 1,3-dihydroxybenzene in caustic alkaline solution. 318 parts (1 mole) of 4-amino-2',4'-dinitro-6'-carboxydiphenylamine are diazotized in the usual way with 69 parts of sodium nitrite in hydrochloric acid solution. The diazo compound is coupled with the monoazo dye at pH 10. On completion of the coupling reaction the dark green disazo dye is coupled with a further 636 parts (2 moles) of the diazo compound 4-amino-2',4'-dinitro-6'-carboxydiphenylamino at a constant pH value of 8.5 maintained by dropwise addition of sodium hydroxide solution. When coupling is finished common salt is added together with a little hydrochloric acid to adjust the pH value to 7. The dye is precipitated and isolated as a dark brown powder, which dies leather in dark yellow-brown shades.

EXAMPLE 2

The monoazo dye is prepared as described in Example 1 from diazotized 1-amino-8-hydroxynaphthalene-3,6-disulfonic acid and 1,3-dihydroxy benzene, and 1 mole coupled in soda-alkaline solution at pH 10.5 with 298 parts (1 mole) of the diazo compound of 4-amino-4'-nitrodiphenylamino-2'-sulfonamide. On completion of coupling the dark-green disazo dye so formed is coupled in acetic acid solution with 138 parts (1 mole) of the diazo compound of p-nitraniline to yield a trisazo dye which is precipitated with common salt. It is obtained as a black powder which dissolves in water with a dark-olive green color and dyes leather in olive shades.

EXAMPLE 3

1 mole of the monoazo dye prepared as given in Example 1 from diazotized 1-amino-8-hydroxynaphthalene-3,6-disulfonic acid and 1,3-dihydroxy benzene is coupled in acetic acid solution (pH 4–5) with 274 parts (1 mole) of the diazo compound of 4-amino-2',4'-dinitrophenylamine. After the reaction the dye is precipitated with common salt and dried. It is in the form of a red-brown powder which dyes leather in dark red-brown shades.

EXAMPLE 4

319 parts (1 mole) of 1-amino-8-hydroxynaphthalene-3,6-disulfonic acid are diazotized in the normal manner and coupled with 110 parts (1 mole) of 1,3-dihydroxybenzene in caustic alkaline solution. The monoazo dye thus formed is coupled with a diazo compound from 274 parts (1 mole) of 4-amino-2',4'-dinitrodiphenylamine at pH 4–5. On completion of coupling the disazo dye is alkalified with sodium hydroxide solution and coupled at pH 9.5–10 with the diazo compound of 446 parts (2 moles) of 1-aminonaphthalene-4-sulfonic acid. The resulting tetrakisazo dye is completely precipitated with common salt and dried to give a dark-brown powder which dyes leather in deep dark-brown shades having very good fastness properties.

EXAMPLE 5

319 parts of 1-amino-8-hydroxynaphthalene-3,6-disulfonic acid are diazotized in the normal way and coupled with 110 parts of 1,3-dihydroxybenzene in caustic alkaline solution. The resulting monoazo dye is coupled with a diazo compound of 274 parts (1 mole) of 4-amino-2',4'-dinitrodiphenylamine at pH 4–5. On completion of coupling the disazo dye is alkalified with sodium hydroxide solution and coupled at pH 9.5–10 with the diazo compound of 223 parts (1 mole) of 1-aminonaphthalene-4-sulfonic acid. When complete coupling has taken place the diazo compound of 309 parts (1 mole) of 4-amino-4'-nitro-2'-sulfo-diphenylamine is slowly added at pH 9.5–10. On completion of this coupling reaction the final tetrakisazo dye is precipitated with common salt and dried. It is obtained as a black-brown powder which dyes leather in dark yellow-brown shades.

The following Table I contains particulars of further dyes which can be obtained according to the procedures of Examples 3, 4 and 5. In column I the basic scheme of the dye of Formula III is shown and in columns II, III and IV the further components are enumerated which are suitable for the synthesis of dyes of Formula I. In column V the shade of the dyeing on leather is noted. The diazo compounds listed in column II can be coupled in acid medium preferably in the 2-position of the 1,3-dihydroxybenzene nucleus.

*Table 1*

| Ex. No. | (I) | (II) | (III) | (IV) | (V) |
|---|---|---|---|---|---|
| 6 | 1-amino-8-hydroxynaphthalene-3,6-disulfonic acid 1,3-dihydroxybenzene. | 4-amino-2',4'-dinitro-diphenylamine. | 1-amino-4-methoxy-benzene. | | Dark yellow-brown. |
| 7 | ----do---- | ----do---- | 1-aminobenzene-4-sulfonic acid. | | Dark red-brown. |
| 8 | ----do---- | ----do---- | 1-amino-4-nitrobenzene. | | Dark-brown. |
| 9 | ----do---- | ----do---- | 1-amino-4-nitrobenzene-2-sulfonic acid. | | Dark red-brown. |
| 10 | ----do---- | ----do---- | 1-amino-2-methylbenzene-4-sulfonic acid. | | Do. |
| 11 | ----do---- | ----do---- | 1-amino-naphthalene-6-sulfonic acid. | | Do. |
| 12 | ----do---- | ----do---- | 1-aminonaphthalene-4-sulfonic acid. | | Do. |
| | ----do---- | ----do---- | 4-amino-1,1'-azobenzene-4'-sulfonic acid. | | Do. |

Table 1—Continued

| Ex. No. | (I) | (II) | (III) | (IV) | (V) |
|---|---|---|---|---|---|
| 14 | 1-amino-8-hydroxynaphthalene-3,6-disulfonic acid 1,3-dihydroxybenzene. | 4-amino-2',4'-dinitro-diphenylamine. | 2-amino-naphthalene-5-sulfonic acid. | | Dark brown. |
| 15 | ___do___ | ___do___ | 2-aminonaphthalene-6,8-disulfonic acid. | | Do. |
| 16 | ___do___ | ___do___ | 1-amino-4-methoxy-benzene. | 1-amino-4-methoxy-benzene. | Dark yellow-brown. |
| 17 | ___do___ | ___do___ | 1-aminobenzene-4-sulfonic acid. | 1-aminobenzene-4-sulfonic acid. | Dark red-brown. |
| 18 | ___do___ | ___do___ | 1-amino-4-nitrobenzene. | 1-amino-4-nitrobenzene. | Dark brown. |
| 19 | ___do___ | ___do___ | 1-amino-4-nitrobenzene-2-sulfonic acid. | 1-amino-4-nitrobenzene-2-sulfonic acid. | Do. |
| 20 | ___do___ | ___do___ | 1-amino-2-methyl-benzene-4-sulfonic acid. | 1-amino-2-methyl-benzene-4-sulfonic acid. | Do. |
| 21 | ___do___ | ___do___ | 1-aminonaphthalene-6-sulfonic acid. | 1-aminonaphthalene-6-sulfonic acid. | Do. |
| 22 | ___do___ | ___do___ | 4-amino-1,1'-azobenzene-4'-sulfonic acid. | 4-amino-1,1'-azobenzene-4'-sulfonic acid. | Do. |
| 23 | ___do___ | ___do___ | 2-aminonaphthalene-5-sulfonic acid. | 2-aminonaphthalene-5-sulfonic acid. | Do. |
| 24 | ___do___ | ___do___ | 2-aminonaphthalene-6,8-disulfonic acid. | 2-aminonaphthalene-6,8-disulfonic acid. | Brown. |
| 25 | ___do___ | ___do___ | 1-amino-2-hydroxy-3,5-dinitro-benzene. | 4-amino-4'-nitro-2'-sulfo-diphenylamine. | Dark yellow-brown. |
| 26 | ___do___ | ___do___ | 1-amino-2-hydroxy-5-nitrobenzene. | | Dark-brown. |
| 27 | [Structure: 1-hydroxy-2-(p-(2,4-dihydroxyphenylazo)benzamido)naphthalene-3,6-disulfonic acid] | ___do___ | 1-amino-4-nitrobenzene-2-sulfonic acid. | | Brown. |
| 28 | [Structure: 1-hydroxy-2-(p-(2,4-dihydroxyphenylazo)benzamido)naphthalene-3,6-disulfonic acid] | ___do___ | 1-aminonaphthalene-4-sulfonic acid. | 1-amino-2,4-dimethyl-benzene-6-sulfonic acid. | Do. |
| 29 | 1-amino-8-hydroxy-naphthalene-4-sulfonic acid→1,3-dihydroxybenzene. | ___do___ | 1-aminonaphthalene-7-sulfonic acid. | | Do. |
| 30 | ___do___ | ___do___ | ___do___ | 1-aminobenzene-4-sulfonic acid. | Dark red-brown. |
| 31 | 1-amino-8-hydroxy-naphthalene-4,6-disulfonic acid→1,3-dihydroxybenzene. | ___do___ | 4-amino-1,1'-azobenzene-3,4'-disulfonic acid. | | Dark brown. |
| 32 | ___do___ | ___do___ | ___do___ | 1-amino-4-methoxy-benzene. | Brown. |
| 33 | [Structure: 1-hydroxy-2-(p-(3-chloro-2,4-dihydroxyphenylazo)benzamido)naphthalene-3,6-disulfonic acid] | ___do___ | 1-amino-4-methoxy-benzene. | | Do. |
| 34 | [Structure: 1-hydroxy-2-(p-(3-chloro-2,4-dihydroxyphenylazo)benzamido)naphthalene-3,6-disulfonic acid] | ___do___ | ___do___ | 1-amino-4-methoxy-benzene. | Do. |

*Table 1*—Continued

| Ex. No. | (I) | (II) | (III) | (IV) | (V) |
|---|---|---|---|---|---|
| 35 | [structure: naphthalene with OH, NH-OC, HO$_3$S, SO$_3$H; benzene with Br; N=N; benzene with HO, OH] | 4-amino-2',4'-dinitro-diphenylamine. | 1-amino-4-methoxy-benzene. | -------- | Brown. |
| 36 | [structure: naphthalene with OH, NH-OC, HO$_3$S, SO$_3$H; benzene with Br; N=N; benzene with HO, OH] | ----do---- | ----do---- | 1-amino-4-methoxy-benzene. | Do. |
| 37 | [structure: naphthalene with OH, NH-OC, HO$_3$S, SO$_3$H; benzene with CH$_3$; N=N; benzene with HO, OH] | ----do---- | ----do---- | -------- | Do. |
| 38 | [structure: naphthalene with OH, NH-OC, HO$_3$S, SO$_3$H; benzene with CH$_3$; N=N; benzene with HO, OH] | ----do---- | ----do---- | 1-amino-4-methoxy-benzene. | Do. |
| 39 | [structure: naphthalene with OH, NH-OC, HO$_3$S, SO$_3$H; benzene with OCH$_3$; N=N; benzene with HO, HO] | ----do---- | ----do---- | -------- | Do. |
| 40 | [structure: naphthalene with OH, NH-OC, SO$_3$H, SO$_3$H; benzene with C$_2$H$_5$; N=N; benzene with HO, OH] | ----do---- | ----do---- | -------- | Do. |
| 41 | [structure: naphthalene with OH, NH-OC, SO$_3$H, SO$_3$H; benzene with OC$_2$H$_5$; N=N; benzene with HO, OH] | ----do---- | ----do---- | -------- | Do. |

In Table 2 below details are given of further dyes which can be obtained using the procedures of Examples 1 and 2. In column I the basic scheme of the dye of Formula III is shown and in columns II, III and IV further components are enumerated which are suitable for the synthesis of dyes of Formula I. Column V gives the shade of the dyeing on leather.

The diazo compounds listed in column II can be coupled in an acid medium preferably in the 2-position of the 1,3-dihydroxybenzene nucleus when they contain a carboxyl group. The diazo compounds listed in columns II, III and IV can be coupled in an alkaline medium in the 2- or 4-position of the 1,3-dihydroxybenzene nucleus or in the 7-position of the naphthalene nucleus.

Table 2

| Ex. No. | (I) | (II) | (III) | (IV) | (V) |
|---|---|---|---|---|---|
| 42 | 1-amino-8-hydroxy-naphthalene-3,6-disulfonic acid→1,3-dihydroxybenzene | 4-amino-2',4'-dinitro-6'-carboxydiphenylamine | 1-amino-4-methoxybenzene | | Dark olive-brown. |
| 43 | ....do.... | ....do.... | ....do.... | 1-amino-4-methoxy-benzene | Do. |
| 44 | ....do.... | ....do.... | 1-aminobenzene-4-sulfonic acid | 1-aminobenzene-4-sulfonic acid | Do. |
| 45 | ....do.... | ....do.... | ....do.... | 1-amino-4-nitrobenzene | Do. |
| 46 | ....do.... | ....do.... | 1-amino-4-nitrobenzene | | Do. |
| 47 | ....do.... | ....do.... | ....do.... | 1-amino-2-methylbenzene-5-sulfonic acid | Do. |
| 48 | ....do.... | ....do.... | 1-amino-2-methylbenzene-5-sulfonic acid | | Do. |
| 49 | ....do.... | ....do.... | ....do.... | 1-amino-2-hydroxy-3,5-dinitrobenzene | Dark red-brown. |
| 50 | ....do.... | ....do.... | 1-amino-2-hydroxy-3,5-dinitrobenzene | | Do. |
| 51 | ....do.... | ....do.... | ....do.... | 1-amino-2-hydroxy-3,5-dinitrobenzene | Dark yellow-brown. |
| 52 | ....do.... | ....do.... | 4-amino-2',4'-dinitro-6'-carboxydiphenylamine | 1-amino-4-methoxy-benzene | Do. |
| 53 | ....do.... | 1-amino-4-methoxybenzene | 4-amino-2',4'-dinitro-6'-carboxydiphenylamine | | Do. |
| 54 | ....do.... | 4-amino-1,1'-azo-benzene-4'-sulfonic acid | 4-amino-2',4'-dinitro-6'-carboxydiphenylamine | | Dark brown. |
| 55 | ....do.... | ....do.... | ....do.... | 4-amino-2',4'-dinitro-6'-carboxy-diphenylamine | Do. |
| 56 | 1-amino-8-hydroxynaphthalene-4-sulfonic acid→1,3-dihydroxybenzene | ....do.... | 1-aminonaphthalene-6-sulfonic acid | | Dark yellow-brown. |
| 57 | ....do.... | 4-amino-2',4'-dinitro-6'-carboxydiphenylamine | 1-amino-4-methylbenzene-2-sulfonic acid | 1-amino-4-methylbenzene-2-sulfonic acid | Brown. |
| 58 | ....do.... | ....do.... | ....do.... | 4-amino-2',4'-dinitro-6'-carboxydiphenylamine | Dark brown. |
| 59 | ....do.... | 4-amino-1,1'-azo-benzene-4'-sulfonic acid | 4-amino-2',4'-dinitro-6'-carboxydiphenylamine | | Do. |
| 60 | 1-amino-8-hydroxynaphthalene-4,6-di-sulfonic acid→1,3-dihydroxy-benzene | 4-amino-2',4'-dinitro-6'-carboxy-diphenylamine | ....do.... | | Brown. |
| 61 | ....do.... | ....do.... | ....do.... | 1-amino-4-methoxy-benzene | Dark yellow-brown. |
| 62 | ....do.... | ....do.... | | | |
| 63 | (structure) | 1-amino-2-methyl-benzene-4-sulfonic acid | 1-aminobenzene-4-sulfonic acid | | Brown. |
| 64 | (structure) | 1-amino-2-methyl-benzene-4-sulfonic acid | 4-amino-2',4'-dinitro-6'-carboxy-diphenylamine | 1-amino-2-methoxy-benzene-5-sulfonic acid | Do. |

Table 2—Continued

| Ex. No. | (I) | (II) | (III) | (IV) | (V) |
|---|---|---|---|---|---|
| 65 | 1-amino-8-hydroxy-naphthalene-3,6-disulfonic acid→1,3-dihydroxy-benzene. | 4-amino-2',4'-dinitro-6'-carboxy-di-phenylamine. | 1-amino-naphthalene-6-sulfonic acid | 1-amino-naphthalene-6-sulfonic acid | Dark yellow-brown. |
| 66 | do | do | 1-amino-naphthalene-7-sulfonic acid | 1-amino-naphthalene-7-sulfonic acid | Do. |
| 67 | do | do | 1-amino-4-nitro-benzene-2-sulfonic acid | 1-amino-4-nitro-benzene-2-sulfonic acid | Dark olive-brown. |
| 68 | do | do | 4-amino-1,1'-azobenzene-4'-sulfonic acid | 4-amino-1,1'-azobenzene-4'-sulfonic acid | Dark yellow-brown. |
| 70 | do | do | 2-(4'-amino)-phenyl-6-methyl-benzenethiazol-sulfonic acid | 2-(4'-amino)-phenyl-6-methyl-benzenethiazol-sulfonic acid | Do. |
| 71 | do | do | 1-amino-naphthalene-4-sulfonic acid | 1-amino-naphthalene-4-sulfonic acid | Dark brown. |
| 72 | do | do | 2-aminonaphthalene-6,8-disulfonic acid | 2-aminonaphthalene-6,8-disulfonic acid | Dark olive-brown. |
| 73 | do | do | 1-amino-2-hydroxy-5-nitrobenzene-3-sulfonic acid | 1-amino-2-hydroxy-5-nitrobenzene-3-sulfonic acid | Dark brown. |
| 74 | do | do | 4-amino-2',4'-dinitro-6'-carboxy-diphenylamine | 4-amino-2',4'-dinitro-6'-carboxy-diphenylamine | Dark yellow-brown. |
| 75 | do | do | ![structure: H2N-naphthalene(SO3H)-N=N-benzene-NH-benzene-NO2] | ![structure: H2N-naphthalene(SO3H)-N=N-benzene-HN-benzene(SO3H)-NO2] | Dark red-brown. |
| 76 | do | do | ![structure: O2N-benzene(OCH3)-N=N-benzene(CH3)(SO3H)-NH-benzene-NO2] | 1-amino-4-methoxy-benzene | Dark brown. |
| 77 | do | 1-amino-2-hydroxy-5-nitrobenzene-3-sulfonic acid. | 4-amino-2',4'-dinitro-6'-carboxy-diphenylamine | 4-amino-2',4'-dinitro-6'-carboxy-diphenylamine | Dark yellow brown. |
| 78 | do | 1-amino-naphthalene-6-sulfonic acid. | do | do | Do. |
| 79 | do | 1-amino-naphthalene-7-sulfonic acid. | do | do | Do. |
| 80 | do | 1-amino-naphthalene-4-sulfonic acid. | do | do | Do. |
| 81 | do | 4-amino-1,1'-azobenzene-4'-sulfonic acid. | 2-aminonaphthalene-6,8-disulfonic acid | 2-aminonaphthalene-6,8-disulfonic acid | Do. |

DYEING EXAMPLE A 100 parts of freshly tanned, neutralized chrome grain leather are entered into a bath of 250 parts of water at 65° and 1 part of the dye of Example 1 in a drum dyeing machine. The leather is drummed for 30 minutes. 2 parts of an anionic fat liquor based on sulfonated train oil are added to the bath and drumming continued for 30 minutes. The leather is dried and finished in the usual way. It is dyed to a level, dark yellow-brown shade.

DYEING EXAMPLE B 100 parts of calf suede leather are wetted back for 4 hours in a bath of 1000 parts of water and 2 parts of ammonia in the drum dyeing machine. The leather is then dyed for 1½ hours in a fresh bath prepared with 500 parts of water at 65°, 2 parts of ammonia, and 10 parts of the dye of Example 2 in aqueous solution. To exhaust the dyebath 4 parts of 85% formic acid are slowly added and drumming continued until complete fixation of the dyeing. The leather is washed off, dried and finished by the normal method, and buffed on the suede side. It is dyed in a very level olive shade.

DYEING EXAMPLE C 100 parts of chrome lamb leather are drummed for 45 minutes in a bath of 1000 parts of water at 55°, 10 parts of the dye of Example 3, and 1.5 parts of an anionic sperm oil emulsion. Subsequently, 5 parts of 85% formic acid are added slowly for exhaustion and drumming continued for 30 minutes to obtain complete fixation of the dyeing. The leather is dried and finished in the usual way. It is dyed in a level dark red-brown shade.

DYEING EXAMPLE D

A solution is prepared with 20 parts of the dye of Example 4, 847 parts of water, 150 parts of ethyl glycol and 3 parts of 85% formic acid. It is applied to the grain side of a buffed, combination tanned side leather by spraying, curtain coating or with a plush pad, and the dyeing dried under mild conditions. In this way a level surface dyeing is produced which serves as a ground for subsequent finishing with opaque colored pigments and synthetic resin binders.

Formulae of representative dyes of the foregoing examples are as follows:

EXAMPLE 1

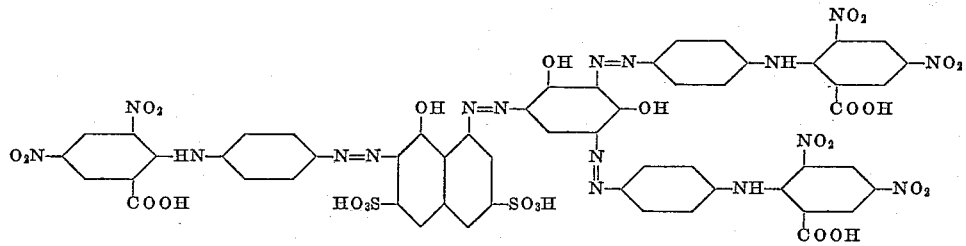

EXAMPLE 4

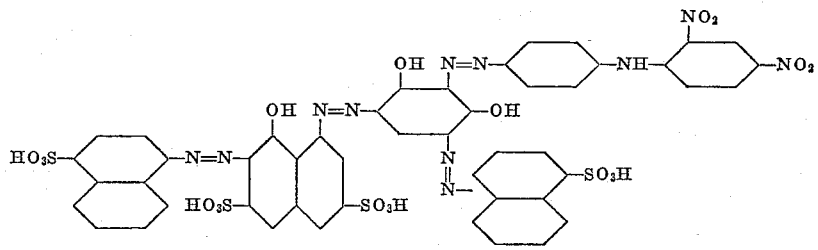

EXAMPLE 5

A mixture of two polyazo dyes of the formulae

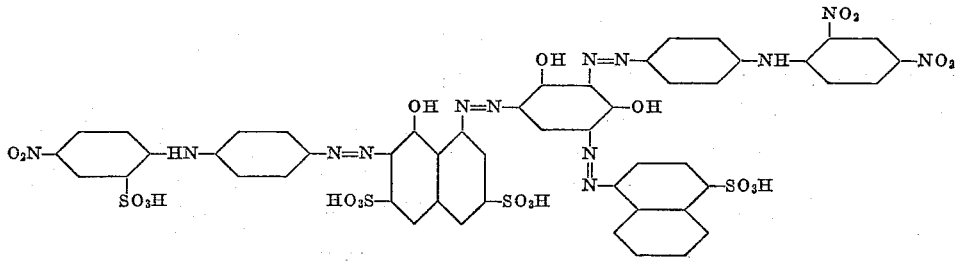

and

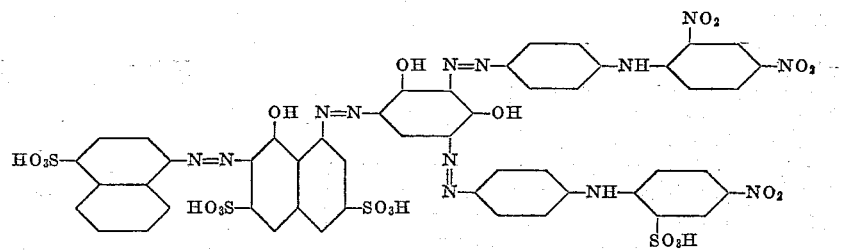

EXAMPLE 25

A mixture of two polyazo dyes of the formulae

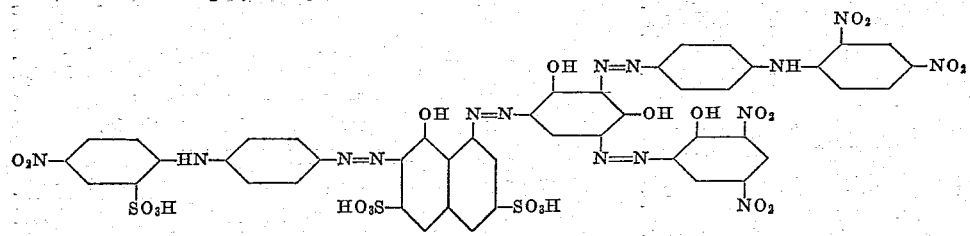

and

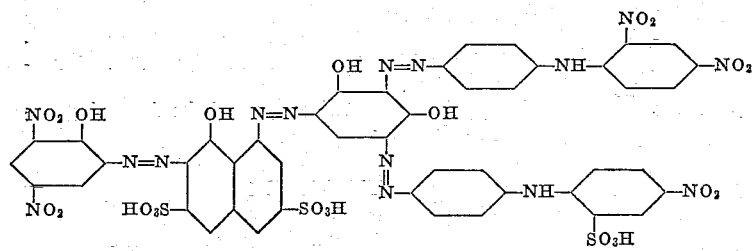

EXAMPLE 26

A mixture of two polyazo dyes of the formulae

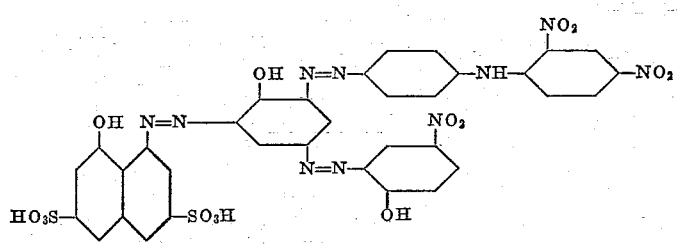

and

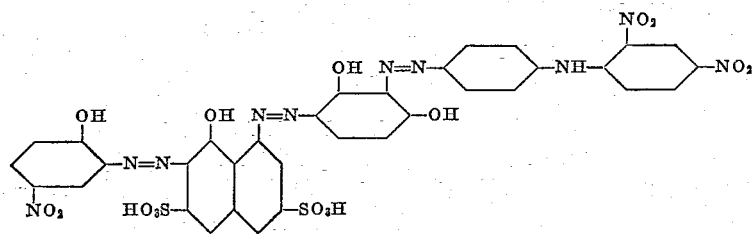

Having thus disclosed the invention what I claim is:

1. Polyazo dye of the formula

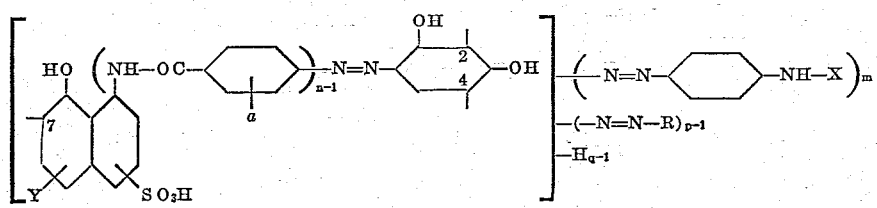

wherein $n$ is one of the integers 1 and 2, $m$, $p$ and $q$ each is one of the integers 1, 2 and 3, the sum $m+p+q$ being 5, $a$ is a member selected from the group consisting of hydrogen, halogen, lower alkyl, lower alkoxy, $y$ is a member selected from the group consisting of hydrogen and a sulfonic acid group, X is a member selected from the group consisting of the moieties

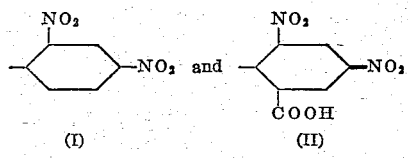

diphenylamino which contains moiety I being attached to the 2-position of the resorcin nucleus and diphenylamino which contains moiety II being attached to one of the numbered free positions in the aforesaid formula, and R is the radical of a diazo component selected from the group consisting of diazotized
4-amino-2',4'-dinitro-6'-carboxydiphenylamine,
1-aminonaphthalene-sulfonic acid,
2-aminonaphthalene-disulfonic acid,
4-amino-4'-nitro-2'-sulfo-diphenylamine,
1-amino-lower alkoxy-benzene,
1-amino-lower alkoxy-benzene-sulfonic-acid,
1-aminobenzene-monosulfonic-acid,
1-amino-mononitrobenzene,
1-amino-mononitrobenzene-sulfonic-acid,
1-amino-loweralkylbenzene-sulfonic acid,
4-amino-1,1'-azobenzene-sulfonic acid,
4-amino-1,1'-azobenzene-disulfonic acid,
1-amino-2-hydroxy-dinitrobenzene,
1-amino-2-hydroxy-mononitrobenzene-sulfonic acid,
1-amino-2-hydroxy-mononitrobenzene,
1-amino-di-loweralkylbenzene sulfonic acid,
2-(4'-amino)-phenyl-6-loweralkylbenzenethiazol-sulfonic acid,
4-nitro-4'-(4''-aminonaphthyl-1''-azo)-1,1'-diphenylamine-2,6''(7'')-disulfonic acid, and
4-nitro-4'-(2''-methyl-4''-nitro-5''-methoxyphenyl-azo)-1,1'-diphenylamino-2-sulfonic acid.

2. The polyazo dye of the formula

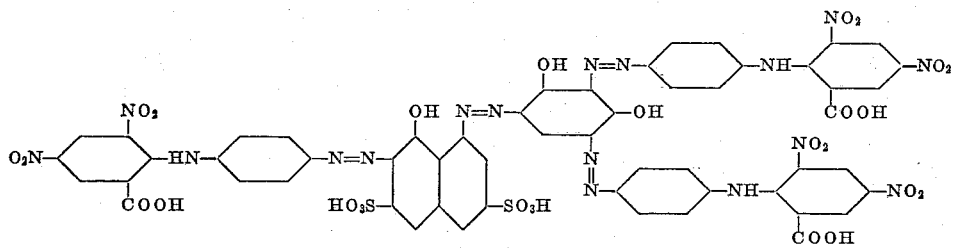

3. The polyazo dye of the formula

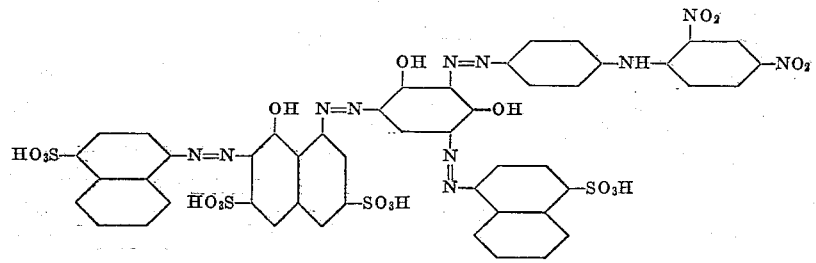

4. The mixture of two polyazo dyes of the formulae

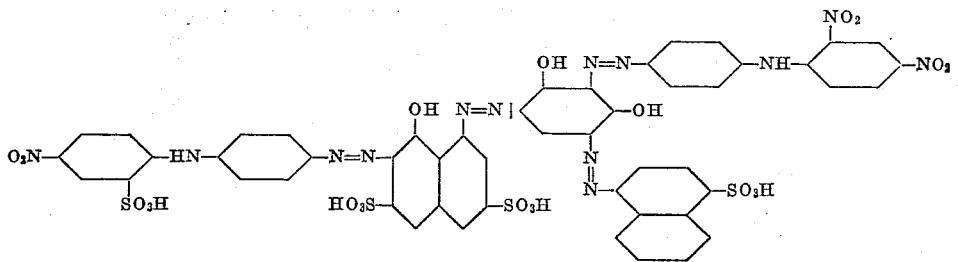

and

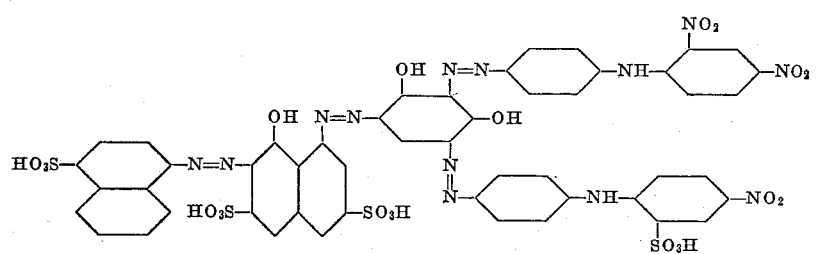

5. The mixture of two polyazo dyes of the formulae

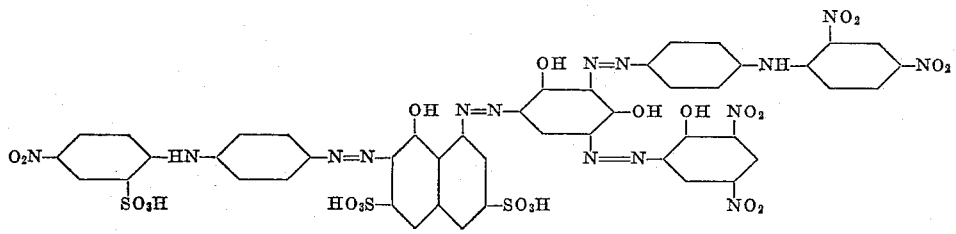

and
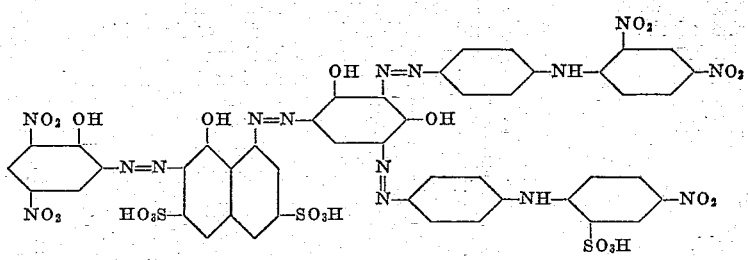
6. The mixture of two polyazo dyes of the formulae
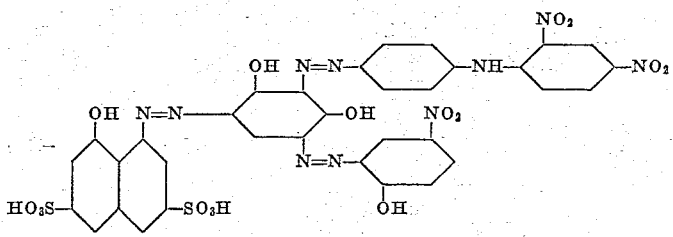
and
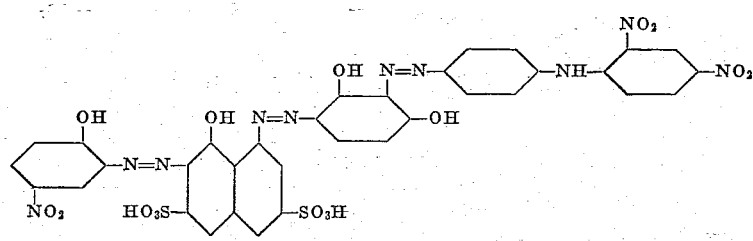
References Cited by the Examiner
UNITED STATES PATENTS
| | | | |
|---|---|---|---|
| 2,061,545 | 11/36 | Bosshart et al. | 260—166 XR |
| 2,758,109 | 8/56 | Huss et al. | 260—169 |
| 2,830,979 | 4/58 | Goebel et al. | 260—166 XR |
CHARLES B. PARKER, *Primary Examiner.*